United States Patent [19]  [11] 4,239,961
Lasar  [45] Dec. 16, 1980

[54] PHOTOELECTRIC LIGHT CURTAIN USING RETROREFLECTOR

[76] Inventor: Theodore Lasar, 40 First Ave., New York, N.Y. 10009

[21] Appl. No.: 5,721

[22] Filed: Jan. 23, 1979

[51] Int. Cl.² ............................................. G01D 21/04
[52] U.S. Cl. ................................... 250/221; 340/556
[58] Field of Search .............. 250/221, 222, 223, 234, 250/235, 236; 340/555, 556, 557

[56] References Cited

U.S. PATENT DOCUMENTS

| 2,769,374 | 11/1956 | Sick | 250/221 |
| 3,360,654 | 12/1967 | Muller | 250/221 |
| 3,805,064 | 4/1974 | Kornylak | 250/221 |
| 4,107,522 | 8/1978 | Walter | 250/221 |
| 4,127,771 | 11/1978 | Sick | 250/221 |

Primary Examiner—David C. Nelms
Attorney, Agent, or Firm—S. C. Yuter

[57] ABSTRACT

A low-cost photoelectric machine access safety device is technically disclosed in the specification and drawings comprising an integral support structure supporting a retrodirective reflective (RDR) material facing an enclosed area which is to be guarded. A rotatable mirror causes a light beam from a reflex photohead to scan the guarded area. The RDR material reflects the light beam back along the transmitted path at varying angles of incidence. A photocell in the reflex photohead is activated to operate a control circuit to keep a control relay energized. Upon any interruption of the scanning light beam the relay is deenergized causing the accessed machine to stop. False operation preventing means prevents false operation when the light beam is scanning the portion of the support structure on which the rotatable mirror and associated apparatus is mounted. Fail-safe circuitry is also disclosed.

8 Claims, 7 Drawing Figures

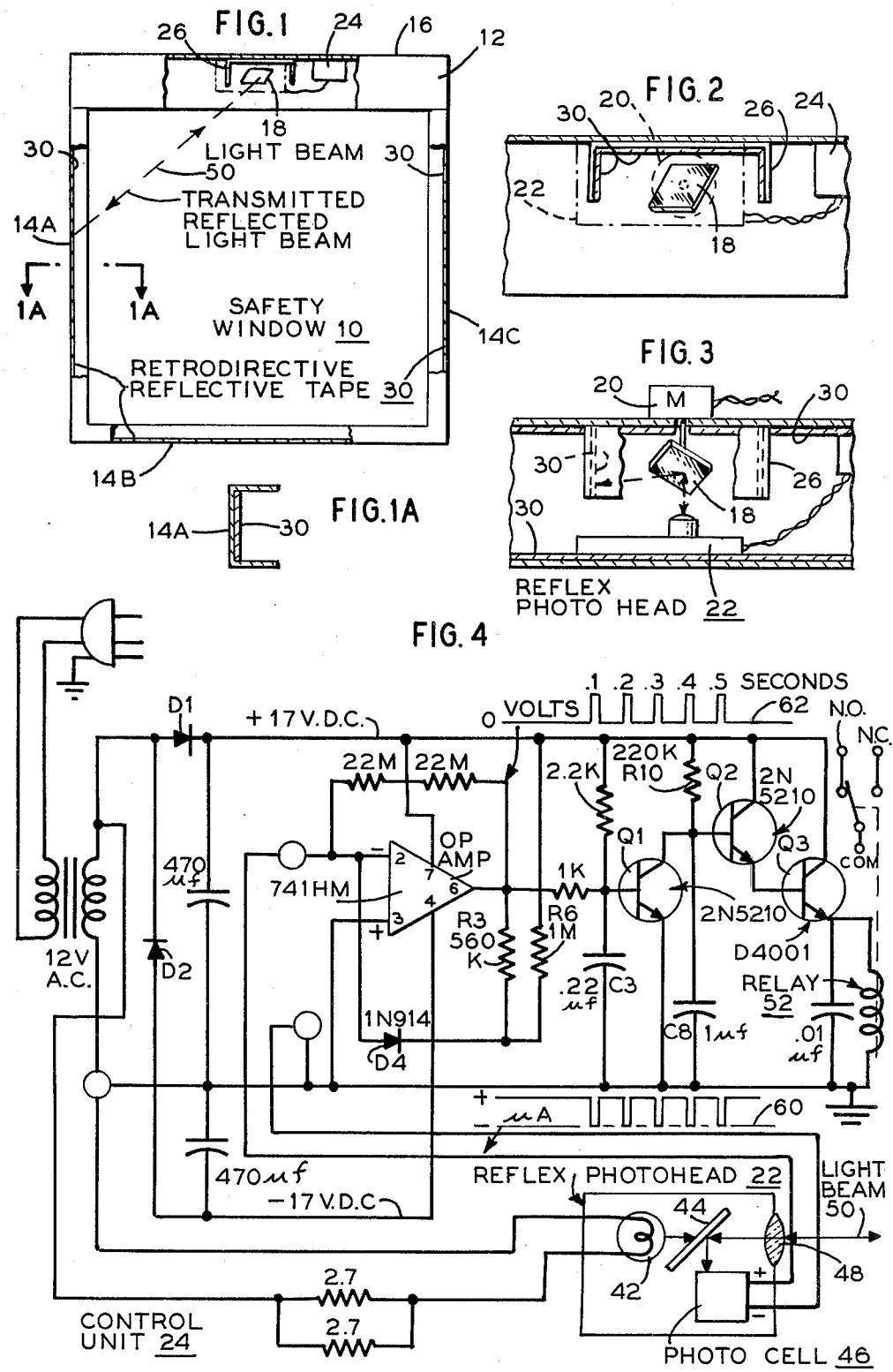

PHOTOELECTRIC LIGHT CURTAIN USING RETROREFLECTOR

SUMMARY OF INVENTION

This invention relates to a safety device for preventing injury to a machine operator and more particularly to a low-cost photoelectric safety device through which a machine is accessed so that the machine cannot operate when hands or arms are in the access area.

Photoelectric light barriers for preventing accidents to machine operators are well known. The light barrier is positioned between the operator and the machine. Any object which interrupts the barrier causes the machine to stop or reverse.

In one system (Muller U.S. Pat. No. 3,360,654) a light beam is periodically moved in rapid sequence across the area to be protected by a rotating polygonal mirror upon which a beam of light is directed and then reflected by a large concave mirror into parallel rays across the area. Separate at the other side of the area is a linear reflector which has the property of always reflecting incident light back into its direction of incidence irrespective of the incidence angle; that is, the reflector is retrodirective. A portion of the reflected light is passed to a photoelectric detector. Any interruption in the reflected light operates a control circuit to stop the machine. But this system is too expensive for many machine owners with the result that operators are injured. Similarly, other light barrier systems are too expensive for large scale use.

The general object of the invention is to provide a relatively low-cost photoelectric machine access safety device suitable for large scale use.

Another object of the invention is to provide a machine access safety device which may be quickly and inexpensively installed yet permits full access to work.

Still another object of the invention is to provide a photoelectric machine access safety device which can be shipped inexpensively.

Yet another object of the invention is to provide an integral, light weight, portable plug-in machine access safety device which is ready for use.

These and other objects of the invention are achieved by a photoelectric machine access device comprising an integral support structure having an inside surface fully enclosing the guarded area. Mounted on the inside surface of the support structure is retrodirective reflective (RDR) tape. A reflex photohead together with a rotatable mirror is also mounted on an inside surface. The rotatable mirror scans the guarded area by reflecting a beam of light directly from the photohead lamp to the RDR tape, at varying incidence angles, and back to the photohead photocell. (No concave mirror is used.) Any interruption in the scanning light beam causes the photocell to operate a control unit which stops the accessed machine. False operation prevention means, preferably a U-shaped RDR tape-lined member adjacent the rotatable mirror, prevents operation of the control unit when the light beam is scanning the portion of the support structure on which the rotatable mirror and photohead are mounted.

A significant advantage of the invention is the reliability of operation achieved at low cost by using a reflective material which operates efficiently over a relatively large range of incidence angles so that there is no need for an expensive precision optical system.

An advantage of the invention is that the integral support structure can be inexpensively fabricated in a rectangular shape comprising four separate sides which can be shipped knocked-down to reduce shipping costs but which can be quickly, simply and easily reassembled at the machine site.

Another advantage of the invention is that the guarded area is clearly and precisely defined so that the machine operator can time the operation of the machine more efficiently.

Still another advantage of the invention is its rapid response time when any portion of the machine operator's body is in the guarded area.

Yet another advantage is the relatively inexpensive fail-safe features which may be employed.

Still another advantage is that the invention has uses other than as a safety window for access to machines. These include use in connection with plastic injection molding for scanning the opened mold to insure that no pieces remain after the molded object is removed. It may also be used to survey stock on a shelf to detect when a product is removed—for example, to detect shoplifting. Also to control opening a door by entry into the scanned adjacent area. Detection of people and animals passing through a door is still another use. Generally, the invention is useful in any photodetection installation where area scanning, as distinctive from single beam linear scanning, is desirable.

But notwithstanding the low-cost effectiveness of the invention, it should be emphasized that it is only a supplement to normal safety procedures and is not intended to be relied on solely.

These and other advantages of the invention, together with additional objects and features, will be apparent from the following detailed description and specification of the invention made in connection with the accompanying drawings wherein like references refer to the same or similar parts throughout the several figures.

FIGURES OF THE DRAWING

FIG. 1 is a front view of the low-cost photoelectric machine safety device through which an operator accesses a controlled machine, in accordance with the preferred embodiment of the invention using a rectangular support structure and a U-shaped RDR tape lined member to prevent false operation.

FIG. 1A is a cross-sectional view taken along lines 1A—1A of FIG. 1 showing the retrodirective reflective tape.

FIG. 2 is a fragmentary enlarged view of the rotatable mirror and false operation member of FIG. 1 with the reflex photohead shown in dotted outline, all mounted on the supporting side.

FIG. 3 is a fragmentary plan view, broken away, of FIG. 2 showing the rotatable mirror motor and reflex photohead in relationship to the mirror and false operation member.

FIG. 4 is a schematic drawing of the control unit of FIG. 1 and showing the details of the reflex photohead and control relay.

DETAILED DESCRIPTION AND SPECIFICATION OF THE INVENTION

Figure 6:
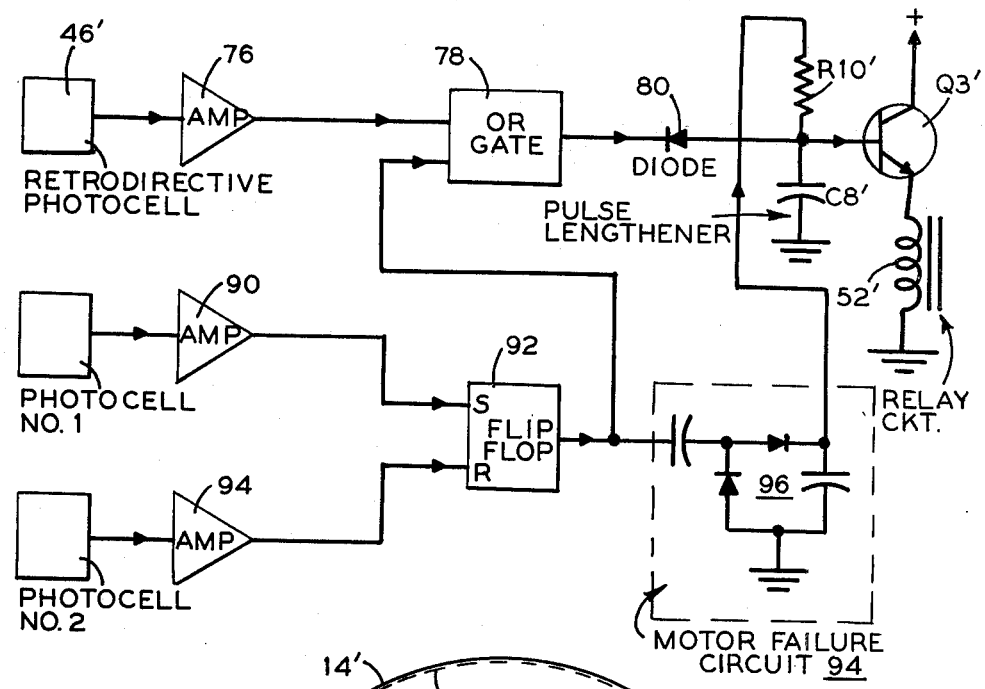
FIG. 6 is a schematic drawing of the control unit used with FIG. 5 and including a motor failure circuit.

Referring to the low-cost photoelectric machine access device shown in FIGS. 1-3, safety window 10, the guarded area, is defined by the integral rectangular support structure 12 which encloses it. Rectangular support structure 12 consists of reflecting sides 14A, 14B and 14C together with apparatus supporting side 16. Each of the reflecting sides 14 is a shallow U in cross section. The cross section of supporting side 16 is a deeper U in shape, sufficient to fully extend over the associated apparatus mounted on side 16. The associated apparatus comprises the rotatable mirror 18 mounted near the mid-point of side 16, its motor 20, the reflex photohead 22, the control unit 24 and the U-shaped false operation prevention member 26. The inside base of each of the three U-shaped reflecting sides 14 is continuously lined with retrodirective reflective (RDR) tape 30. The entire inside of the U-shaped false operation prevention member 26 is also lined with RDR tape 30.

The reflex photohead 22 is shown in greater detail in FIG. 4 (lower right). It comprises the lamp 42, partially silvered mirror 44, photocell 46 and lens 48. Lamp 42 when energized produces a light beam 50 which is transmitted through the lens 48 via the partially silvered mirror 44. The light beam 50 is then directed by the rotatable mirror 18 (FIG. 1) to one of the three reflecting sides 14. The RDR tape 30 then reflects the light beam 50 back to the rotatable mirror 18 along the same angle as the angle of incidence. Rotatable mirror 18 then reflects the light beam 50 back through the lens 48 of the reflex photohead 22 where it is reflected by partially silvered mirror 44 to photocell 46 which generates a control signal. The control unit 24 responds to the control signal from photocell 46 to energize relay 52 (FIG. 4) closing its normally open N.O. contact to connect that contact with its common COM contact. The accessed machine only operates when contacts N.O. and COM are closed by virtue of a circuit connection between the machine and the control unit 24's relay contacts. As will be described in greater detail, interruption of the light beam 50 by any part of the operator's body or clothing will interrupt the output signal from photocell 46 and deactivate relay 52 opening the control circuit to the machine to stop or reverse it. The interrupted output signal is a control signal.

An important feature of the invention is the retrodirective reflective (RDR) tape 30. It functions to reflect the incident light beam back along the same light path and it does that over a substantially large range of incidence angles. In the preferred embodiment of the invention RDR tape 30 is sold by the 3M Company of Minneapolis, Minnesota under the number 7610. It will reflect a substantial portion of the incidence light beam back along the same incidence angle in a range of incidence angles including 30 to 90 degrees. It was the recognition of this feature of RDR tape and its conceived use in a photoelectric machine access safety device which, in part, led to the invention as hereinafter claimed. When combined with a safety window enclosing integral support structure it eliminated the need for expensive precision optics to help satisfy a long-felt need for a low-cost machine access safety device. Other features of the invention lower the cost still further.

Another feature of the invention which contributes to its low cost is the U-shaped false operation prevention member 26, also lined with RDR tape 30 (FIG. 2). The safety window 10 could be scanned by an oscillating light beam 50; that is, the mirror 18 could be oscillated back and forth rather than rotated. But oscillation requires more expensive apparatus and is more subject to mechanical breakdown. The simpler and less expensive way is to rotate mirror 18 by an inexpensive motor 20. But then the light beam would be interrupted when it scanned through the side on which it is mounted. The provision of false operation prevention member 26 solved that problem at practically no additional cost. As illustrated in FIG. 3, when the light beam 50 is not scanning the three reflecting sides 14 it is being reflected back by the RDR tape 30 lined inside surface of the U-shaped member 26. Thus there is no interruption of the light beam and no false operation of the control unit 24 during that portion of the rotation cycle of rotatable mirror 18.

Another feature contributing to lower cost is the rectangular supporting structure 12 which provides a convenient integral device when in use. But supporting structure 12 can readily be provided in four separate sides for shipping and assembly at the site. In that embodiment the RDR tape 30 only continuously lines the inside of each of the three reflecting sides. But there is no need for tape abutment at the rectangle's far corners because the light beam 50 spreads enough to overlap each corner. Thus in the working embodiment of the invention the rectangular supporting structure is about three feet wide (between sides 14A and 14B), two feet high (between sides 14B and 16) and three inches deep. With those dimensions the spot of light is about one inch in diameter (actually an image of the lamp 42 filament) as it traverses each of the far corners. So the light beam 50 easily overlaps the corner to prevent any interruption. This would be true, of course, even if the supporting structure 12 was not capable of being broken down into its four sides for shipping.

Additional details of the working embodiment are as follows:

Lens 44: 81 mm focal length×22 mm diameter
Lamp 42: 12 V.A.C. four candle power
Photocell 46: Silicon solar cell type, $\frac{1}{2}$ cm×$\frac{1}{2}$ cm
Motor 20: 600 RPM synchronous type.

FIG. 4 discloses the actual circuit of the working embodiment of the invention, together with its component values. As long as the light beam 50 is uninterrupted photocell 46 generates a positive signal, which is fed to the negative terminal 2 of the Op Amp (operational amplifier). That positive input signal produces a negative output signal at the output terminal 6 of the Op Amp negatively charging capacitor C3. Transistor Q1 is thus nonconducting so that current from R10, amplified by transistors Q2 and Q3, energizes relay 52 and contacts N.O. and COM are closed so that the accessed machine can be operated.

Now assume that the machine operator's hand enters the safety window 10. Rotatable mirror 18 is rotating at 600 revolutions per minute or ten per second. Thus the light beam 50 is interrupted every tenth of a second interrupting the photocell 46 output signal to produce a corresponding change in photocell current (in microamperes) as shown in wave form 60 (FIG. 4). The output voltage of the Op Amp goes to zero at each 0.1 second interruption as shown in wave form 62. Transistor Q1 conducts each 0.1 second, once for each rotation of mirror 18. Capacitor C8 discharges cutting off transistors Q2 and Q3 and deenergizing relay 52. Relay 52 stays released during the interrupted light beam 50 because the charge time of capacitor C8 is longer than the time between light interruptions. When relay 52 releases contacts N.O. and COM open and N.C. and COM close to stop or reverse the machine, give an audio or visual alarm or perform any other desired control function.

Figure 5:
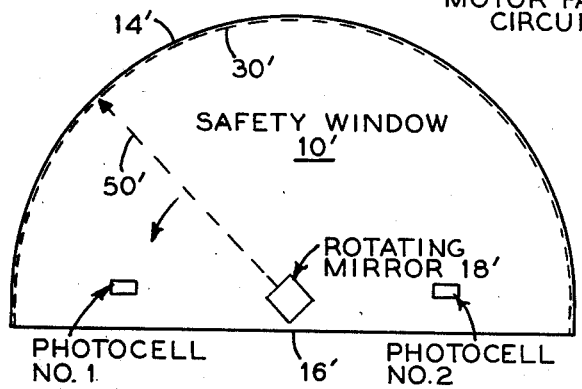
FIG. 5 is a schematic view of another embodiment of the invention using an arcuate RDR surface and photocells to prevent false operation when the rotatable mirror is scanning the apparatus supporting side.

FIGS. 5 and 6 disclose an alternate embodiment of the invention with parts corresponding to those of the preferred FIGS. 1–3 embodiment shown with the same reference characters but with a prime designation added. The principal differences in the embodiments is that in FIG. 5 the reflecting side 14' is arcuate instead of rectangular and false operation prevention when the light beam is scanning the supporting side 16' is performed by photocells Nos. 1 and 2. Like the oscillating alternative for rotating mirror 18 in FIG. 1, these differences increase the cost but are considered within the spirit of the invention as hereinafter claimed.

In normal operation (without light beam interruption) photocell 46' receives light reflected from RDR tape 30' as it sweeps the safety window 10'. Amplifier 76 (FIG. 6) produces a positive voltage in response to the signal from the photocell 46'. The positive voltage is gated through OR gate 78 to diode 80. The base of transistor Q3' is thus supplied with current via resistor R10' and the relay 52' is energized. An interruption in the light beam 50' causes the output of amplifier 76 to drop momentarily to zero. The output of the OR gate 78 similarly drops causing the discharge of capacitor C8' through diode 80. Relay 52' thus releases because capacitor C8' is quick to discharge but slow to charge through resistor R10'.

When the light beam 50' enters the deadzone it strikes photocell No. 1 before it leaves RDR tape 30'. Amplifier 90 sets flip flop 92 so that its output is a positive voltage which passes through OR gate 78 replacing the positive voltage on the base of Q3' previously supplied from receipt by the photocell 46' of light reflected from RDR tape 30'. Relay 52' thus remains energized even though the photocell 46' now goes dark. When the light beam 50' leaves the dead zone it again strikes RDR tape 30' restoring the positive voltage to the OR gate 78 in response to the signal from photocell 46'. At substantially the same time the light beam 50' strikes photocell No. 2 producing an amplified positive output signal from amplifier 94 which resets flip flop 92 producing a negative voltage at its output. However, OR gate 78 continues to pass the more positive voltage output from amplifier 76 so that any interruption in the light beam 50' will release relay 52'.

The output of flip flop 92 thus cycles once every 0.1 second and that output is used by the motor failure circuit 94 to indicate that the motor 20 is turning the rotating mirror 18'. Motor circuit 94 comprises a rectifier circuit 96 which converts the flip flop 92 output voltage to direct current which is used to supply voltage to resistor R10' to enable relay 52' to remain energized. Failure of the motor 20 to turn causes relay 52' to release even though the light beam 50' is striking RDR tape 30'.

Additional fail-safe features of the invention are provided. If the A.C. power fails the relay 52 (52') will be released. Similarly, failure of the lamp 42 will cause the relay to release.

While RDR tape is preferred in the FIGS. 5–6 embodiment because of ease of application and cost, in place of RDR tape 30' may be used RDR plastic or glass reflectors since the angle of incidence of the light beam 50' is always substantially 90 degrees. Also, in both illustrated embodiments, a light emitting diode may be used in place of lamp 42 together with a pulse source to energize it; also a laser beam.

What is claimed is:

1. A relatively low-cost photoelectric machine access safety device comprising:
   (a) an integral rectangular support structure having separable sides with each of three sides having an inside surface enclosing a guarded area through which an associated machine is accessed;
   (b) retrodirective reflective means mounted in a continuous path on each of the three inside surfaces and facing the guarded area;
   (c) integral photoelectric light transmission and receiving means mounted on the inside surface of the fourth side for generating a control signal when transmitted light is not received;
   (d) rotatable mirror means positioned adjacent the mid-point on the inside surface of the fourth side and adapted to reflect a light beam transmitted by said photoelectric means directly to said retrodirective reflective means at a varying incidence angle and back along the same light path directly to said photoelectric means;
   (e) rotating means mounted on the fourth side for rotating said rotatable mirror so that the reflected light beam scans all of the guarded area whereby any body within the guarded area will interrupt the scanning light beam causing said photoelectric means to generate a control signal;
   (f) control means mounted on said support structure coupled to said photoelectric means and responsive to a control signal for stopping the associated machine accessed through the guard area; and
   (g) U-shaped retrodirective reflective means mounted between said rotatable mirror means and the fourth side for reflecting the light beam, when said rotatable mirror means is scanning the fourth side, for preventing false operation of said control means.

2. A relatively low-cost photoelectric machine access safety device comprising:
   (a) an integral rectangular support structure with each of three sides having an inside surface enclosing a guarded area through which an associated machine is accessed;
   (b) retrodirective reflective means mounted in a substantially continuous path on each of the three inside surfaces and facing the guarded area;
   (c) integral photoelectric light transmission and receiving means mounted on the inside surface of the fourth side for generating a control signal when transmitted light is not received;
   (d) movable reflector means positioned adjacent the fourth side and adapted to reflect a light beam transmitted by said photoelectric means directly to said retrodirective reflective means at a varying incidence angle and back along the same path directly to said photoelectric means;
   (e) moving means mounted on the fourth side for moving said movable reflector means so that the reflected light beam scans all of the guarded area whereby any body within the guarded area will interrupt the scanning light beam causing said photoelectric means to generate a control signal; and (f) control means mounted on said support structure and coupled to said photoelectric means and responsive to a control signal for stopping the associated machine accessed through the guard area.

3. A relatively low-cost photoelectric machine access safety device comprising:
   (a) an integral support structure having an inside surface enclosing a guarded area through which an associated machine is accessed;
   (b) continuous retrodirective reflective means mounted in a path on the inside surface and facing the guarded area;
   (c) photoelectric light transmission and receiving means mounted on said support structure for generating a control signal when transmitted light is not received;
   (d) movable reflector means positioned adjacent said support structure and adapted to reflect a light beam transmitted by said photoelectric means directly to said retrodirective reflective means along an incidence angle and back along the same light path directly to said photoelectric means;
   (e) moving means mounted on said support structure for moving said movable reflector means so that the reflected light beam scans all of the guarded area whereby any body within the guarded area will interrupt the scanning light beam causing said photoelectric means to generate a control signal; and
   (f) control means coupled to said photoelectric means and responsive to a control signal for stopping the associated machine accessed through any part of the guard area.

4. The photoelectric machine access safety device of claim 2 or claim 3 wherein said movable reflector means is a rotatable mirror and further comprising false operation preventing means for preventing false operation of said control means when said rotatable mirror is scanning the side supporting said rotatable mirror.

5. The photoelectric machine access safety device of claim 4 wherein said false operation preventing means comprises retrodirective reflective means.

6. The photoelectric machine access safety device of claim 4 wherein said false operation preventing means comprises photocell-gating means.

7. The photoelectric machine access safety device of claim 3 wherein said integral support structure comprises an arcuate surface supporting a retrodirective reflective means.

8. The photoelectric machine access safety device of claim 1 or claim 3 further comprising failure detection means.

* * * * *